United States Patent
Krupakaran et al.

(10) Patent No.: US 10,474,644 B2
(45) Date of Patent: Nov. 12, 2019

(54) SYSTEMS AND METHODS FOR OPTIMIZING SELECTION OF A REPLICATION DATA NODE IN A DISTRIBUTED FILE SYSTEM

(71) Applicant: DELL PRODUCTS L.P., Round Rock, TX (US)

(72) Inventors: Kesava Vijaya Krupakaran, Chennai (IN); Balaji Venkat Venkataswami, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 523 days.

(21) Appl. No.: 14/638,810

(22) Filed: Mar. 4, 2015

(65) Prior Publication Data
US 2016/0259813 A1 Sep. 8, 2016

(51) Int. Cl.
G06F 17/30 (2006.01)
G06F 7/00 (2006.01)
G06F 16/182 (2019.01)
G06F 16/178 (2019.01)

(52) U.S. Cl.
CPC ........ G06F 16/1844 (2019.01); G06F 16/178 (2019.01)

(58) Field of Classification Search
CPC ................ G06F 16/178; G06F 16/1844
USPC ........................................ 707/637
See application file for complete search history.

(56) References Cited

U.S. PATENT DOCUMENTS

| | | | | |
|---|---|---|---|---|
| 2008/0270822 A1* | 10/2008 | Fan | ........................ | H04W 4/02 714/4.1 |
| 2011/0196828 A1* | 8/2011 | Drobychev | ....... | G06F 17/30581 707/622 |
| 2014/0059310 A1* | 2/2014 | Du | ......................... | G06F 3/065 711/162 |
| 2014/0122429 A1* | 5/2014 | Chen | ................. | G06F 17/30174 707/623 |
| 2014/0304354 A1* | 10/2014 | Chauhan | ............. | H04L 67/1095 709/213 |
| 2015/0088827 A1* | 3/2015 | Xu | .................... | G06F 17/30215 707/634 |

OTHER PUBLICATIONS

Praveenkumar Kondikoppa et al., "Newark-Aware scheduling of mapreduce framework on distributed clusters over high speed networks," Workshop on Cloud Services, Federation of the 8th Open Cirrus Summit, Sep. 21, 2012, San Jose, CA (6pgs).

* cited by examiner

Primary Examiner — Kuen S Lu
(74) Attorney, Agent, or Firm — North Weber & Baugh LLP

(57) ABSTRACT

Aspects of the present invention include optimizing selection of a replication data node in a Hadoop Distributed File System. In embodiments of the present invention, optimizing the replication data node selection can be based on a priorities based algorithm. In embodiments of the present invention, optimizing replication data node selection can be based on a relative comparison of parameters.

20 Claims, 6 Drawing Sheets

SYSTEMS AND METHODS FOR OPTIMIZING SELECTION OF A REPLICATION DATA NODE IN A DISTRIBUTED FILE SYSTEM

BACKGROUND

Field of Invention

The present invention relates generally to data storage and more particularly to storage using a Hadoop Distributed File System.

Description of the Related Art

A Hadoop Distributed File System (HDFS) is a framework for distributed storage and distributed processing of big data. Hadoop is a set of algorithms which allows storing huge amount of data, and processing it in a much more efficient and faster manner using distributed processing.

As storage of large amounts of data becomes more and more common in large server farms, HDFS becomes much more critical. HDFS runs on a cluster of computers with a tree hierarchical network topology. For example, a cluster can consist of many data centers filled with racks of computers.

HDFS uses a name node to keep track of where the data blocks are stored and meta-data including permissions, file size, and block storage information, and data nodes, storage nodes where files are stored. In HDFS, when a file is stored, it is stored as multiple blocks. The typical size of a block is 64 MB or more. The blocks are not stored on a single server, but are distributed across multiple servers.

For example, a single file could be stored across ten blocks and each block could be stored in a different data node on a different server. Also, each block is replicated on a different data node for redundancy in the event of a failure. Typically, HDFS systems maintain a redundancy of three, in other words, each block is replicated twice. Since the block is replicated twice and at least once on a different rack or data center, transfer of the 64 MB or larger block can use a significant amount of network bandwidth. The prior art systems do not consider an optimal path for the transfer. Since Hadoop networks use such large blocks of 64 MB or more, replicating the data blocks can be taxing on the network.

HDFS block placement strategy heavily relies on the rack awareness of the name node. The prior art approach treats every off rack data node as if they are equidistant from one another. In other words, the only information considered is whether the data node is on the rack or not. Prior art systems do not consider the distance between the data nodes, for example, the distance could be single hop distance or multi-hop distance. Also, the bandwidth used in the transfer is not considered in prior art systems.

One disadvantage of this system is that HDFS assumes that all off-rack data nodes are equidistant.

Accordingly, what is needed is a system and method for considering the distance between two data nodes when determining the replication of the blocks in HDFS.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DETAILED DESCRIPTION OF THE PREFERRED EMBODIMENTS

Figure 1:
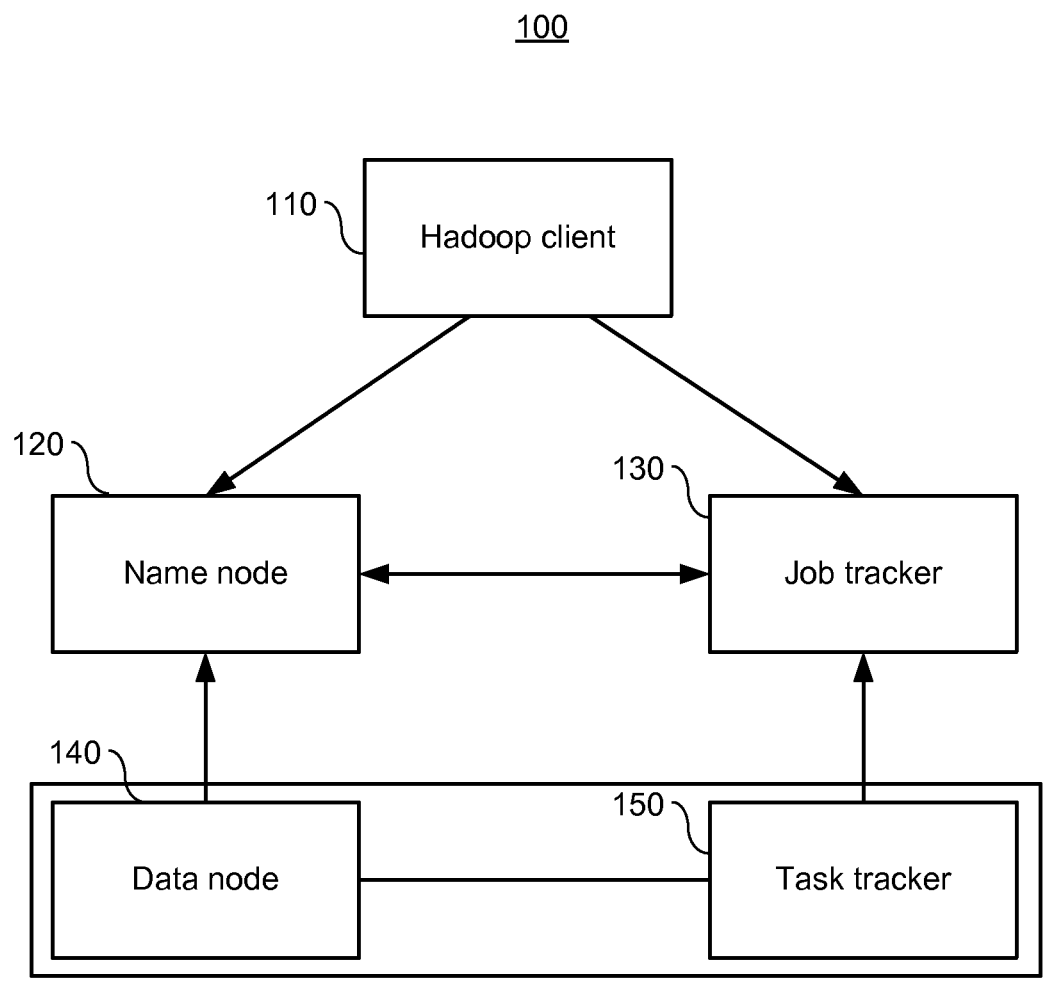
FIG. 1 depicts a block diagram of a HDFS according to embodiments of the present invention.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to deploy power measurement on a component level in a live network or to design network devices.

It shall also be noted that although embodiments described herein may be within the context of power consumption in a network device, the invention elements of the current patent document are not so limited. Accordingly, the invention elements may be applied or adapted for use in other contexts.

Embodiments of the present invention use the current Hadoop HDFS system to take advantage of bandwidth savings. Embodiments of the present invention use the name node and data nodes present in prior art Hadoop systems, but also consider the distance used in transferring blocks between data nodes.

In order to make more informed decision on block placement the HDFS can consult with a Software Defined Networking (SDN) controller, which is aware of network topology and other parameters to give a better relative distance between data nodes.

SDN controller can get information from the data center. For example, it can get link state and network parameters. SDN controller can use that information to select one data node over another for replicating a block. SDN controller provides the relative distance between the 2 data nodes. The Name-node uses the information and places the block at the "closest" data-node.

FIG. 1 depicts a block diagram of a HDFS according to embodiments of the present invention. FIG. 1 shows HDFS 100 including hadoop client 110, name node 120, job track 130, data node 140, and task tracker 150. Name node 120 is a centralized node containing information about the meta data including file name, file size, etc. and also where the files are stored within the data nodes 140. Name node 120 is configured with data node information for a particular data center. For example, the information can be data node A is in data center 1 rack 1.

Job tracker 130 is a central entity for tracking jobs run for a particular site. Task tracker 150 tracks tasks on data nodes. Both job track 130 and task tracker 150 are both part of the HDFS mapping infrastructure.

Figure 2:
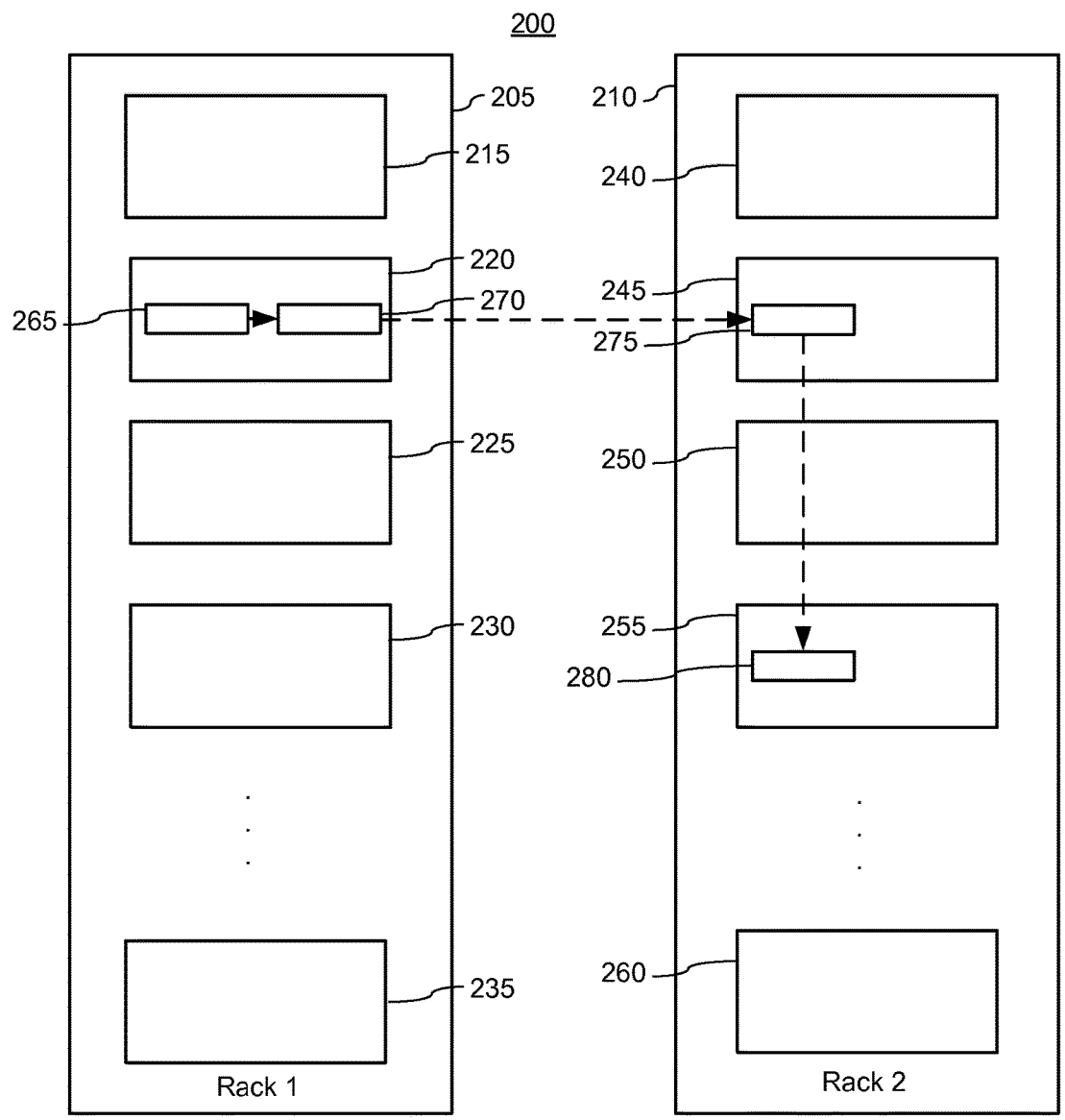
FIG. 2 depicts a block diagram showing data nodes in a HDFS according to embodiments of the present invention.

FIG. 2 depicts a block diagram showing data nodes in a HDFS according to embodiments of the present invention. FIG. 2 show data center 200. Data center 200 includes rack 1 205 and rack 2 210. Within each rack are a plurality of data nodes 215, 220, 230, 235, 240, 245, 250, 255, and 260. Data nodes 215, 220, 230, 235 are within rack 1 205 and data nodes 240, 245, 250, 255, and 260 are within rack 2 210. Each data node stores 215, 220, 230, 235, 240, 245, 250, 255, and 260 a plurality of blocks. For the sake of explanation, some blocks are shown and some are not. Blocks 265 and 270 are shown within data node 220. Blocks 275 and 280 are shown within data nodes 245 and 255, respectively. For the purposes of this example, block 270 is replicated twice in blocks 275 and 280 stored in different data nodes 245 and 255. Therefore, the replication factor of 3 is present and the three blocks are stored in three different data nodes 220, 245, and 255 on two different racks 205 and 210.

In prior art HDFSs name node 335 selects two replication nodes, shown as 275 and 280 for Source data node 270 in FIG. 2. In prior art Hadoop systems name node 335 does not consider an optimal replication node, it merely selects an off rack data node for redundancy. However, embodiments of the present invention select replication nodes based on optimizing the selection of the replication nodes.

Figure 3:
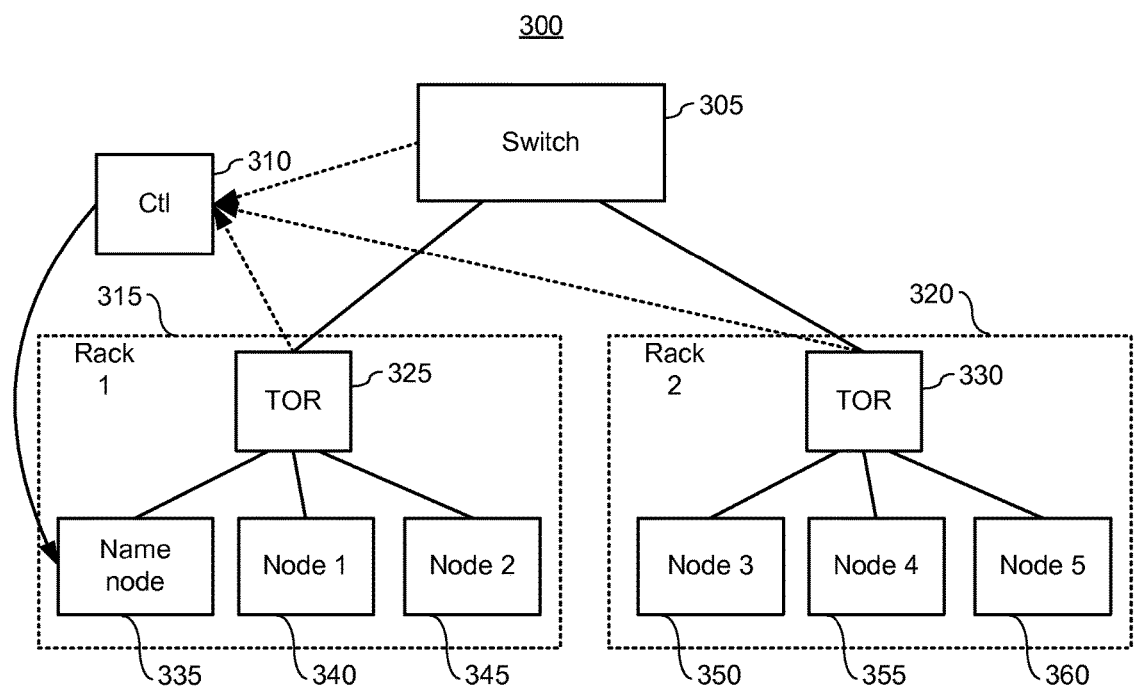
FIG. 3 depicts a block diagram of a HDFS according to embodiments of the present invention.

FIG. 3 depicts a block diagram of a HDFS according to embodiments of the present invention. FIG. 3 shows switch 305 coupled to Top of Rack (TOR) 325 and 330 for each of rack 1 315 and rack 2 320, respectively. FIG. 3 also shows name node 335 and data node 1 340, data node 2 345, data node 3 350, data node 4 355, and data node 5 360. FIG. 3 also shows controller 310. Controller 310 receives information from switch 305, and TORs 325 and 330. Controller 310 also provides information to name node 335 so that name node 335 can determine an optimal off rack location to replicate a particular data block.

In one embodiment, controller 310 is made aware of the network topology by making it a passive listener to the link state advertisements of Open Shortest Path First/Intermediate System to Intermediate System (OSPF/ISIS) to build the link state database.

Name node 335, depending on the replication factor can decide on a candidate list of data node options. For example, name node 335 can have information that data nodes X, Y, and Z are candidate off-rack destinations. Name node 335 can query control 310 to get the relative distance of these nodes from source data node S 270 as shown in FIG. 2.

These distances can be calculated at controller 335 based on multiple network parameters. Name node 335 can converge on the optimal destination.

The following network parameters can be exported to the controller to calculate the distance. These metrics can be considered because they are important Transmission Control Protocol (TCP) parameters and Hadoop transfers run over TCP. It will be understood by one of ordinary skill in the art that any metrics can be considered and the present invention is not limited to these particular metrics. The following metrics can be considered by controller 310:

(1) Configured metric: Interface metric configured in routing protocol;

(2) Total bandwidth: Link bandwidth;

(3) Average port buffer availability: The buffer availability computed from port buffer utilization pointing to congestion factor over a time window; and (4) Average Round Trip Time (RTT): The average Round Trip Time form source to destination over a time window.

Controller 310 can use the parameters to select a data node location in many ways. Examples of two ways controller 310 can use the parameters are: a priority based computation or a pre-determined default tie breaker described with reference to FIGS. 5 and 6. Controller 310 can send the selection information to name node 335 after it is queried.

Figure 4:
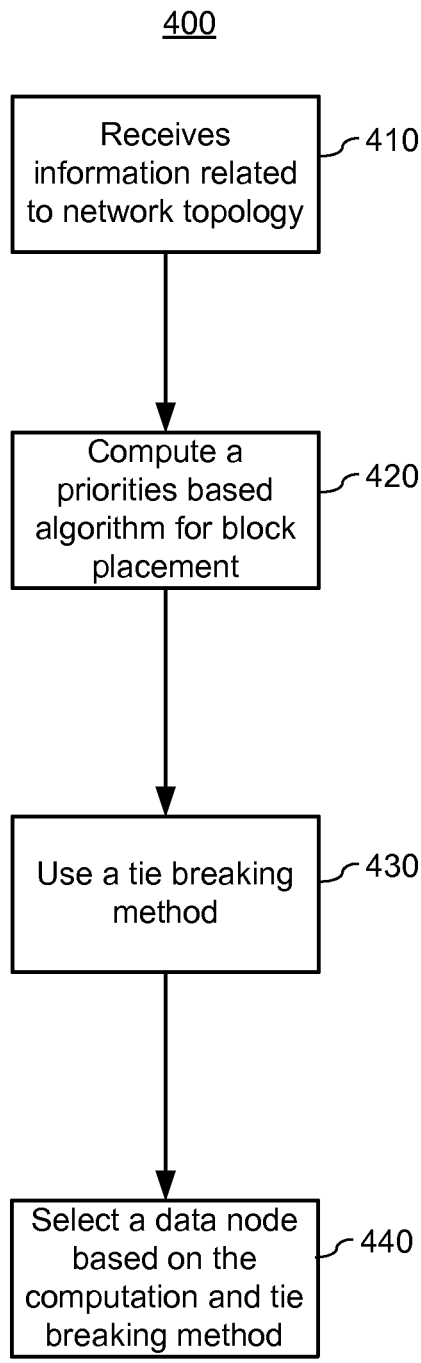
FIG. 4 depicts a flowchart used with a HDFS according to embodiments of the present invention.

FIG. 4 depicts a flowchart used with a HDFS according to embodiments of the present invention. FIG. 4 shows method 400 including receiving information related to network topology 410, computing a priorities based algorithm for block placement 420, using a tie breaking method 430, and selecting a data node based on the computation or tie breaking method 450. Controller 310 can receive information regarding network topology 410. Controller 310 can also compute a priorities based algorithm to determine distance between a source node and a candidate replication node 420. Controller 310 can also use comparison method to evaluate two or more potential replication node candidates 430. Controller 310 can select a potential replication node based on the algorithm or evaluation of potential candidate nodes.

Figure 5:
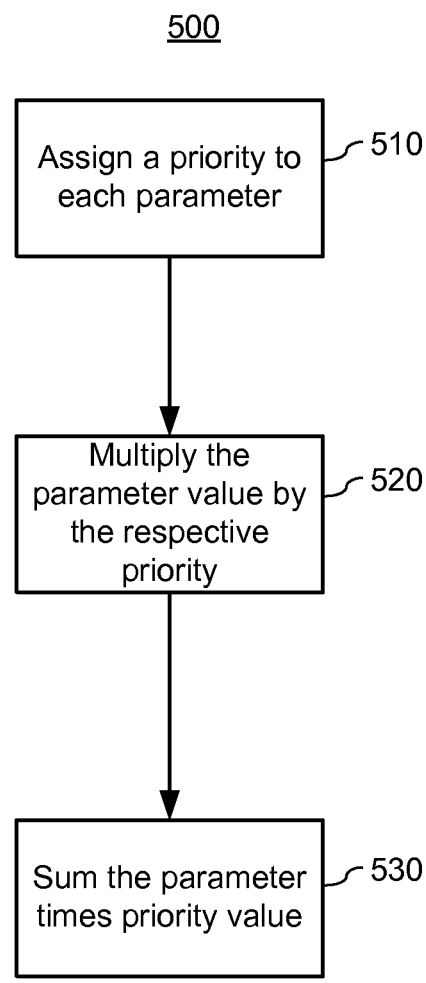
FIG. 5 depicts a flowchart of a priorities computation according to embodiments of the present invention.

FIG. 5 depicts a flowchart of a priorities computation according to embodiments of the present invention. FIG. 5 shows assigning a priority to each parameter 510, multiplying the parameter value by the respective priority 520, and summing the parameter times priority value.

A priority based computation can use the metrics with a user definable priority. Each metric can have a priority associated with it. For example, a user might consider bandwidth the most important parameter and in that case can set the priorities accordingly. Also, different priorities can be set at different times or for different applications. The following algorithm can be used:

$$\text{distance}=p1*\text{metric}+p2*\text{bandwidth}+p3*\text{bufferavailability}+p4*\text{RTT}$$

These priorities can be configurable. The priorities allow certain network parameters to have higher weight than others or certain parameters to have lower weight than others. For example, during block replication, latency is not as important throughput. Thus, the RTT could be given lower priority than the bandwidth.

Figure 6:
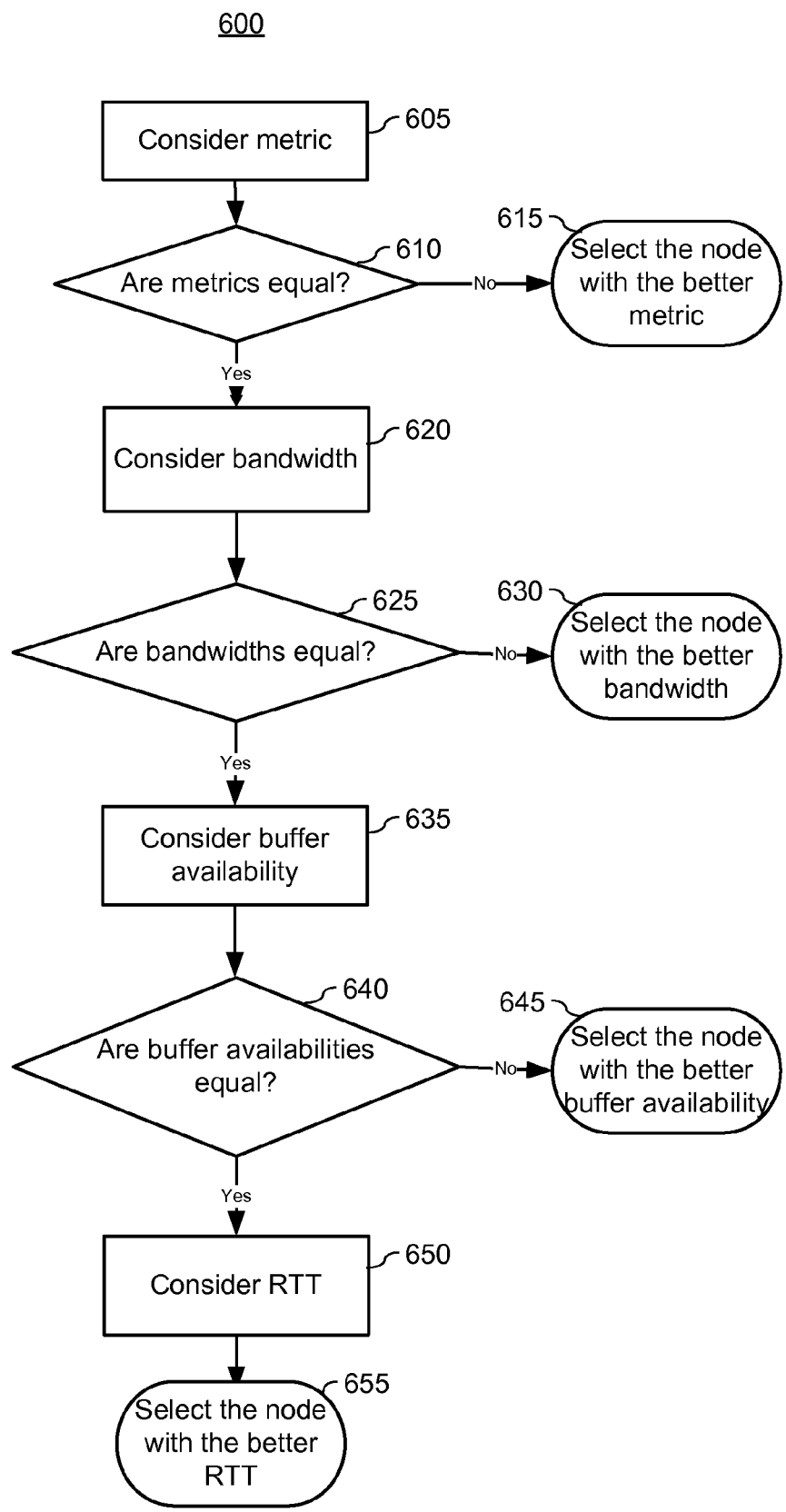
FIG. 6 depicts a flowchart of a method to compare relative desirability of two or more replication data nodes.

FIG. 6 depicts a flowchart of a method to compare relative desirability of two or more replication data nodes. FIG. 6 shows one example of a method to compare the relative desirability of two nodes. It will be understood by one of ordinary skill in the art that any parameters can be used, in any order in FIG. 6. The parameters and order shown in FIG. 6 is just one example.

FIG. 6 shows consider metric 605. Compare the metrics, if they are equal 610, then consider bandwidth 620. If the metrics are not equal, then select the data node with the more desirable metric 615. If the bandwidths are equal 625, then consider buffer availability 635. If the bandwidths are not equal, then select the data node with the more desirable bandwidth 630. If the buffer availabilities are equal 640, then consider RTT 650. If the buffer availabilities are not equal, then select the data node with the more desirable buffer availability 645. Select the node with the more desirable RTT 650.

The method shown in FIG. 6 can be used in the event there are two distances computer using FIG. 5 that are close or it can be used instead of the computation method shown in FIG. 5.

The methods shown in FIGS. 5 and 6 can be used to optimize the initial block placement. Hadoop provides filesystem tools for block reshuffling which will normalize the initial block placement optimization. However, these tools cannot be run with high frequency.

Embodiments of the present invention provide enhanced network awareness to the name node without burdening the HDFS with network intricacies.

The prior art implementation of Hadoop is not altered radically to have significant performance improvements using embodiments of the present invention.

Topology awareness can be used in other areas, for example, the placement of reducers. Mappers can run parallel on data-nodes where the HDFS blocks are placed. The reducers have one to many relationship with mappers. A reducer can get input from multiple mappers. Thus, the reducer should be placed as close as possible to the mappers. The output of mappers transferred over the network is much smaller than the block size and hence not an elephant flow. Here the latency should be minimized as it affects the overall execution time. Thus, RTT can be given a higher priority.

Hadoop deployments can use commodity hardware without using storage network. Thus embodiments of the present invention need not look into storage network intricacies.

One advantage of the present invention is that Hadoop networks can operate more efficiently since they are not taxed as much by the replication of blocks for redundancy. Another advantage of the present invention is that the prior art implementation of Hadoop can be used with the present invention without modifying the underlying Hadoop architecture.

One of ordinary skill in the art will appreciate that various benefits are available as a result of the present invention. One such benefit is that embodiments of the present invention operate in conjunction with a prior art Hadoop system.

Another benefit is that embodiments of the present invention provide an optimal selection of a replication data node without altering the Hadoop architecture.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A storage system for managing replicas of data blocks distributed across a storage cluster, the system comprising:

one or more processors comprising memory;
a Software Defined Network (SDN) controller communicatively coupled to the one or more processors to receive network data, the SDN controller listens to link state advertisements to generate a database comprising link states and uses the link states and one or more network parameters to determine a relative distance measure between a source node comprising a source block and candidate replication data nodes, the relative distance measure being obtained using one or more user-configurable weights; and
a name node that is different from the source node and is communicatively coupled to the SDN controller, the name node being a centralized node that ascertains where data blocks are stored, queries the SDN controller to obtain at least the relative distance measure, and uses the relative distance measure to select from the candidate replication data nodes a set of data nodes at which to replicate the source block.

2. The system according to claim 1, wherein the network parameters comprise location information regarding data blocks distributed at data nodes within a distributed network.

3. The system according to claim 1, wherein the network parameters comprise at least one of a buffer availability, a bandwidth, or a round-trip time.

4. The system according to claim 3, wherein the controller computes the relative distance measure based on priorities assigned to the network parameters.

5. The system according to claim 4, wherein the SDN controller listens to link state advertisements of Open Shortest Path First/Intermediate System to Intermediate System.

6. The system according to claim 1, wherein the controller computes the relative distance measure based on a comparison of two or more of the network parameters.

7. The system according to claim 1, wherein the controller computes the relative distance measure comprising a sum of two or more network parameters that each is weighted based on its priority.

8. The system according to claim 1, wherein the network data is obtained from at least one data center.

9. A method for managing replicas of a data blocks distributed across a storage cluster in a network, the system comprising:
receiving, from a Software Defined Network (SDN) controller, network data comprising network parameters, the SDN controller listens to link state advertisements to generate a database that comprises link states;
based on at least some of the link state and the network data, determining a relative distance measure between a source node and candidate replication data nodes, the source node comprising a source block, the relative distance measure being obtained using one or more user-configurable weights;
in response to being queried by a name node that is different from the source node, providing the relative distance measure to the name node to select from the candidate replication data nodes a set of data nodes at which to replicate the source block, the name node being a centralized node that ascertains where data blocks are stored;
replicating the source block to obtain a replicated source block; and
storing the replicated source block in the set of data nodes.

10. The method according to claim 9, wherein the network parameters comprise information about a network topology.

11. The method according to claim 9, wherein the network parameters comprise location information regarding data blocks distributed at data nodes within a distributed network.

12. The method according to claim 11, wherein the network parameters comprise at least one of a buffer availability, a bandwidth, or a round-trip time.

13. The method according to claim 9, wherein the controller computes the relative distance measure based on priorities assigned to the network parameters.

14. The method according to claim 13, further comprising, responsive to two data nodes having a same relative distance measure, selecting a data node based on a tie breaker comparison of one or more network parameters.

15. A non-transitory computer-readable medium or media comprising one or more sequences of instructions which, when executed by one or more processors, causes steps for managing replicas of data blocks distributed across a storage cluster comprising:
receiving, from a Software Defined Network (SDN) controller, network data comprising network parameters, the SDN controller listens to link state advertisements to generate a database that comprises link states;
based on at least some of the network data and the link states, determining a relative distance measure between a source node and candidate replication data nodes, the source node comprising a source block, the relative distance measure being obtained using one or more user-configurable weights; and
in response to being queried by a name node providing the relative distance measure to the name node, the name node being a centralized node that ascertains where data blocks are stored and using the relative distance measure to select from the source node that is different from the name node a set of data nodes at which to replicate the source block.

16. The non-transitory computer-readable medium according to claim 15, wherein the one or more processors compute the relative distance measure based on a comparison of two or more of the network parameters.

17. The non-transitory computer-readable medium according to claim 16, wherein the comparison comprises an evaluation of relative strengths of candidate replication data nodes.

18. The non-transitory computer-readable medium according to claim 15, wherein the network parameters comprise at least one of a buffer availability, a bandwidth, or a round-trip time.

19. The non-transitory computer-readable medium according to claim 18, wherein the one or more processors, when computing the relative distance measure, use a database that comprises link state advertisements of Open Shortest Path First/Intermediate System to Intermediate System.

20. The non-transitory computer-readable medium according to claim 19, wherein the priorities are user-configurable.

* * * * *